United States Patent [19]
Higgins et al.

[11] Patent Number: 5,563,958
[45] Date of Patent: Oct. 8, 1996

[54] SYSTEM AND METHOD FOR OPTICAL CHARACTER RECOGNITION BAR-CODED CHARACTERS

[75] Inventors: Raymond L. Higgins, Kitchener; Meera D. Kulkarni, Waterloo, both of Canada

[73] Assignee: NCR Corporation, Dayton, Ohio

[21] Appl. No.: 960,177

[22] Filed: Oct. 9, 1992

Related U.S. Application Data

[63] Continuation of Ser. No. 636,987, Dec. 28, 1990, abandoned.

[51] Int. Cl.⁶ .................................................. G06K 9/18
[52] U.S. Cl. .................................................. 382/183
[58] Field of Search .................................. 382/135, 181, 382/182, 183, 173; 235/379, 449, 462, 463

[56] References Cited

U.S. PATENT DOCUMENTS

| | | | |
|---|---|---|---|
| 3,286,233 | 11/1966 | Lesueur | 340/12 |
| 3,309,667 | 3/1967 | Feissel et al. | 382/12 |
| 3,461,427 | 8/1969 | Parker | 382/12 |
| 3,539,989 | 11/1970 | Hanchett, Jr. et al. | 382/12 |
| 3,688,955 | 9/1972 | L'Huillier et al. | 235/61.11 |
| 4,514,622 | 4/1985 | Wevelsiep et al. | 235/463 |
| 4,646,353 | 2/1987 | Tenge et al. | 382/12 |
| 4,685,138 | 8/1987 | Antes et al. | 382/12 |
| 4,731,858 | 3/1988 | Grasmueller et al. | 382/9 |
| 4,731,861 | 3/1988 | Blanton et al. | 382/48 |
| 4,742,556 | 5/1988 | Davis, Jr. et al. | 382/9 |
| 4,764,971 | 8/1988 | Sullivan | 382/9 |
| 4,776,024 | 10/1988 | Katoh et al. | 382/9 |
| 4,806,741 | 2/1989 | Robertson | 335/462 |
| 4,809,342 | 2/1989 | Kappner | 382/11 |
| 5,091,968 | 2/1992 | Higgins et al. | 382/10 |

*Primary Examiner*—Jose L. Couso
*Attorney, Agent, or Firm*—Elmer Wargo

[57] ABSTRACT

A system and method are disclosed for optical scanning and recognition of bar-coded characters (e.g., CMC7 type characters having a pattern of bars and intervals) recorded on documents such as bank drafts and checks. The system comprises an optical scanner, a microprocessor, a read-only-memory (ROM), a random-access-memory (RAM, with a stored program) for storing data and a plurality of predetermined character-identifying binary codes. The scanner optically scans each document and produces a plurality of grey-scale pixel values corresponding to the bars and intervals of the characters. The grey-scale pixel values are then stored in the RAM under control of the microprocessor. The microprocessor processes the stored pixel values, and effectively locates, and segments each character on the document by taking one or more slices (segments) of each character. Each segment includes a plurality of grey-scale pixel values representing a horizontal slice of a character. The microprocessor than converts the segment of pixel values to a binary code, and compares the binary code to the predetermined binary codes for obtaining a match, identifying the character.

30 Claims, 7 Drawing Sheets

SYSTEM AND METHOD FOR OPTICAL CHARACTER RECOGNITION BAR-CODED CHARACTERS

This is a continuation of application Ser. No. 07/636,987 filed on Dec. 28, 1990, now abandoned.

BACKGROUND OF THE INVENTION

This invention relates to the scanning of documents and the recognition of alphanumeric symbols generally, and particularly to optical scanning and recognition of CMC7 bar-coded characters.

The CMC7 character set, which was developed by the French Company Compagnie des Machines Bull, has received widespread use in financial transactions in many countries, primarily in Europe. Generally, the characters are recorded on documents such as bank drafts and checks in MICR (magnetic ink character record) form for scanning by a magnetic scanner.

A vidicon camera is sometimes used to scan the document and to record an image of it for archival and evidentiary purposes while, in a separate operation, a magnetic scanner is used to read the magnetic-ink characters. This need for two separate scanners to perform two separate operations presents a costly, time-consuming problem.

Another frequent problem, generally associated with optical character recognition, is character adulteration. Character adulteration occurs when the characters, e.g., those printed along the bottom of a document such as a check, are partly obscured (stamped-over or written-over) by stamped information, payor's signature, or a teller's comment.

What is needed and would be useful, therefore, is a system which would not only provide for image scanning and character recognition, thereby eliminating the requirement for two systems and two operations, but would also be able to correctly read partly-obscured characters.

SUMMARY OF THE INVENTION

In accordance with the illustrated preferred embodiment of the present invention, a system and method for optical character recognition are provided which obviate the need for separate magnetic scanners, and which provide accurate identification (recognition) of characters, even partially obscured characters.

In a first aspect of the invention, a system (apparatus) is provided comprising: (a) a CCD scanner for optically scanning a bar-coded character having a predetermined pattern of bars and intervals of different opacities, and producing a plurality of gray-scale pixel values corresponding to said pattern, (b) a memory disposed for storing the gray-scale pixel values, said memory including a stored program and a predetermined binary code for the character, and (c) a processor coupled to the scanner and to the memory, and operating under control of the stored program, for specifying a segment of the character by selecting from said gray-scale pixel values a first set of values representative of the segment, for producing a binary code corresponding to the first set of values, and for identifying the character by matching the produced binary code to the predetermined binary code.

The CCD scanner includes a control logic, the processor includes a microprocessor, and the memory includes a ROM (read only memory) with a boot routine and a RAM (random access memory) with the stored program and predefined character codes.

In a second aspect of the invention, a method is provided for optically identifying a bar-coded character, the character having a predetermined height and width and a predetermined pattern of bars and intervals of different opacities, the method comprising the steps of: (a) optically scanning the character and producing a plurality of gray-scale pixel values representing the bars and intervals, (b) specifying a segment of the character for processing, by selecting from said gray-scale pixel values a first set of values representative of the segment, (c) producing a binary code corresponding to the selected first set of gray-scale values, and (d) identifying the character by matching the produced binary code to a predetermined binary code representing the character.

The characters are recorded on the document in CMC7 format, with each character having seven bars and six intervals between bars, four of the intervals having a short (narrow) width and two of the intervals having a long (wide) width.

The camera (CCD scanner) scans the document and produces a plurality of gray-scale pixel data values representing the opacities of the bars and intervals of individual characters and of other objects imprinted on the document, and opacity of the background of the document. The camera scans the document vertically, from bottom to top, starting at the bottom right corner of the document. The document is moved to the right continuously (with the width of each vertical scan corresponding to the diameter of one pixel), until the top left corner of the document is reached indicating that scanning has been completed.

The pixel values produced by the scanner are stored in the RAM for processing by the microprocessor. In locating each character on the document (as part of a character-segmentation routine), the microprocessor examines the stored pixel values and determines the bottom, right, and left edges, and the bottom right corner coordinate (starting position) of each character. Relative to the starting position, the microprocessor specifies a horizontal segment of the character for processing. It does this by selecting from the stored pixel values a first set of pixel values representative of the segment. The segment corresponds to a one-pixel-high window (marker line) across the width of the character. The microprocessor then selects a second set of values representing the minimum values (troughs/nulls) of the first set. From the minimum values, a threshold value is derived equivalent to the arithmetic mean of the minimum values. The microprocessor then derives a binary code representative of the widths of the intervals associated with the minimum values and their positions relative to the threshold. The derived binary code is then compared with various predetermined binary codes representative of the CMC7 character set. A character is identified (recognized) when the comparison results in a match. Each character on the document is processed as described above until the end of the document (top left corner of the document) is reached.

Additional data such as the width of the long intervals of the character are also derived by the microprocessor and used together with data from the second and third segments of the character to confirm identification of the character with a certain degree of confidence.

DESCRIPTION OF THE PREFERRED EMBODIMENT

Figure 1:
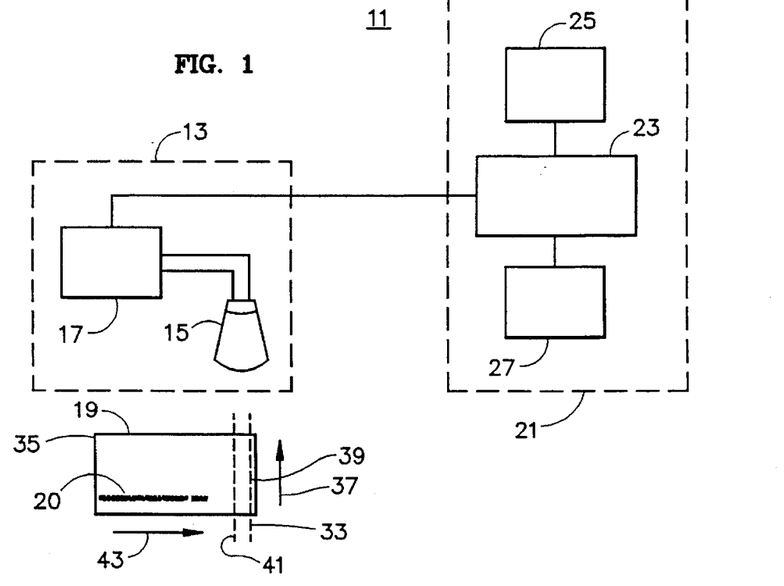
FIG. 1 is a block diagram of the system of the present invention.

FIG. 1 shows a system (apparatus) 11 of the present invention. The system includes an optical camera or scanner 13 for scanning a document 19, and a computer system 21 for processing data received from the scanner 13. The scanner may be a camera with a CCD (charge coupled device) 15 and controller 17. The document 19 may be a bank draft or check with numeric or other bar-coded character 20 recorded thereon. The computer system 21 comprises a microprocessor 23, a ROM (read only memory) 25 with a boot program, a RAM (random access memory with a stored program) 27 for storing data from the scanner and microprocessor, and for storing predefined coded character data.

The scanning operation is commenced at the bottom right corner 33 of the document and ends at the top left corner 35. The scanner 13 scans the document 19 vertically, from bottom-to-top, as shown by arrow 37, first along right-most virtual scan line 39, then again from bottom-to-top along next-right-most virtual scan line 41, and so on until the top left corner of the document is reached. The scan lines are arranged in parallel. The document 19 is moved continuously from left to right, as shown by arrow 43, while the scanner scans along successive scan lines, the width of each scan line corresponding to the diameter (e.g., 0.005") of a pixel.

Figure 2:
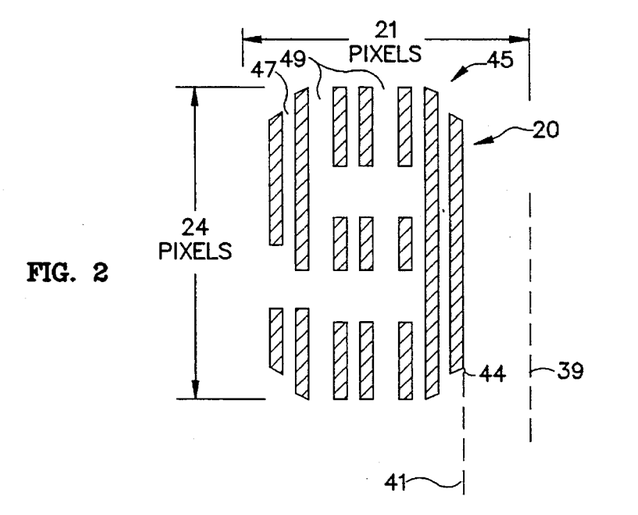
FIG. 2 is a graphic illustration of the appearance of a bar-coded character readable by the system of FIG. 1.

In scanning a document, the system treats each individual character recorded on the document as if the character were bounded in an area 21 pixels wide by 24 pixels high as shown in FIG. 2. Actually, the height of a character may vary from 18 to 30 pixels, and the width of the character may vary from 17 to 23 pixels. The image recorded on the document may be non-magnetic or magnetic, and may comprise various characters (objects), such as the CMC7 MICR characters shown in FIG. 3.

As shown in FIG. 2, each character 20 is uniquely defined by seven parallel vertical bars (data bars) 45, four short intervals 47, and two long intervals 49 between the bars. The scanning direction 37 (FIG. 1) coincides with the direction of the parallel bars. Each bar may be from 0.010 to 0.019 cm. wide, each short interval may be from 0.011 to 0.019 cm. wide, and each long interval may be from 0.031 to 0.039 cm. wide.

The scanning, and processing (segmentation and recognition) of the characters are described in terms of the vertical bars and intervals which make up each character. Although the heights of the individual bars may vary, the widths of the bars and intervals are kept (printed) within a predetermined range. The widths of the bars and intervals for one character are the same as the widths of the bars and intervals for other characters of the same set. To facilitate understanding of the operation of the system, each vertical bar, and each short interval between adjacent bars, will be described as having a width equivalent to the diameter of a pixel, and each long interval is described as having a width equivalent to the diameter of two pixels. Thus, a character may be viewed as being 21 pixels wide, having seven pixels representing the width of the seven vertical bars, four pixels representing the width of the two long intervals, four pixels representing the width of the four short intervals, and six pixels representing the space between adjacent characters (three pixels representing the width of the space on one side of the character, and three pixels representing the width of the space on the other side of the character).

Figure 4:
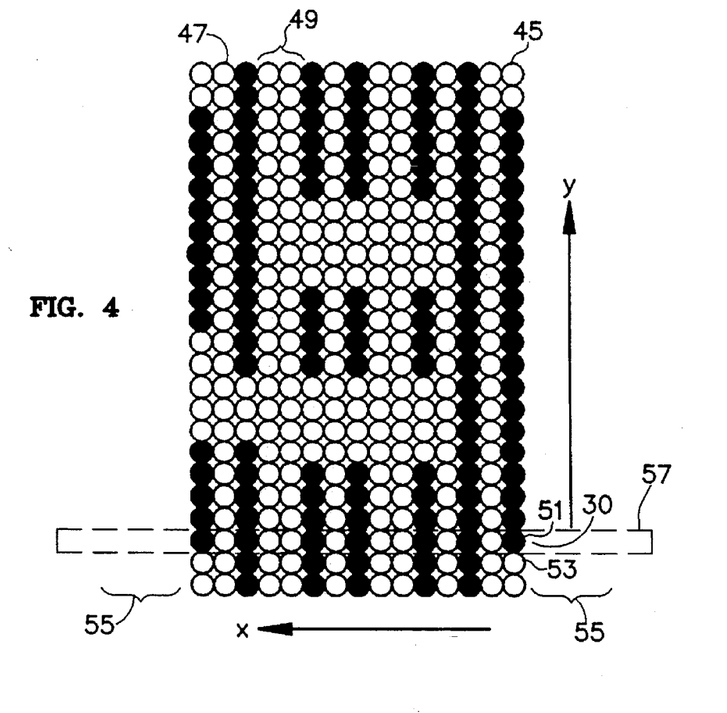
FIG. 4 is a graphic illustration of a character, the character having a matrix of pixels of different opacities (gray-scale values), the matrix showing a window or segment of the character.

When a character is scanned, the pixel values generated by the scanner to represent the various bars and intervals of the character are stored in memory 27 (FIG. 1) as a data array (matrix) having, for example, 24 rows corresponding to the character's height, and 21 columns corresponding to the character's width. As shown in FIG. 2, for example, excluding the pixels which represent the spaces between successive characters and the spaces above and below the characters (i.e., spaces representing the background of the document), the bars and intervals of the character "nine" may be represented in array form as depicted in FIG. 4. Each dark pixel 51 represents a portion of a vertical bar 45 (FIGS. 2 and 4), and has an opacity index or gray-scale value in the range 0–255. Each light pixel 53 represents a portion of an interval 47, 49, or a portion of an inter-character space 55, and has an opacity/gray-scale value of 0–255. The dark pixels generally have a greater gray-scale value (approaching 255), and the light pixels generally have a lesser gray-scale value (approaching 0).

As indicated above, these gray-scale data values are generated by the scanner, upon scanning a document. The generated data are then stored in memory 27 (FIG. 1) for processing by the system. The system, under control of the stored program, examines the stored data values, and proceeds to define the various character fields (character groups) and the boundary of each character within a field. Starting with the stored gray-scale data values obtained from scanning, from bottom-to-top, along the right-most scan line 39 (FIGS. 1 and 2), and then from bottom-to-top along the next-right-most scan line, and so on, the system segments the characters as shown and described in FIGS. 5A–D. It does this by searching the stored data first for a gray-scale value representing a dark pixel. A dark pixel is a pixel whose gray-scale value is greater than the gray-scale value of its right neighbor (right-adjacent pixel) by more than a predetermined value (e.g., 16). When a dark pixel value is found (representing a detected dark spot on the document), the system then checks to determine if a data bar pattern exists nearby to the left of the detected dark spot. It does this by examining the gray-scale values corresponding to the pixels that are horizontally adjacent and to the left of the detected dark spot. Refer, for example, to window 57 (FIG. 4). The window is 25 pixels wide, and one pixel high. If, upon moving from right to left within the window, at least four stored peak data values and two null data values are found, representing at least four dark pixels and two light pixels, a data bar pattern is deemed to be present near the detected dark spot. (A peak value of a pixel is any gray-scale value for that pixel which is greater than the values of the neighboring (left-adjacent and right-adjacent) pixels. A null value of a pixel is any gray-scale value for that pixel which is less than the values of the neighboring pixels.)

Upon detecting a data bar, the system, under program control, then proceeds to determine the boundaries (bottom, right, and left edges) of the character comprising the detected bar. If no bar is detected proximate to the dark spot, the spot is treated as noise and disregarded, and the remaining stored pixel data (representing the rest of the vertical scan line) are examined until a dark spot is detected, or until the end of the scan line is reached. If no bar is detected at the end of a vertical scan (i.e., after examination of the stored data corresponding to a complete vertical scan), the system effectively shifts left by one pixel and proceeds to examine the next group of stored data representing the next scan line for a dark spot.

Figure 3:
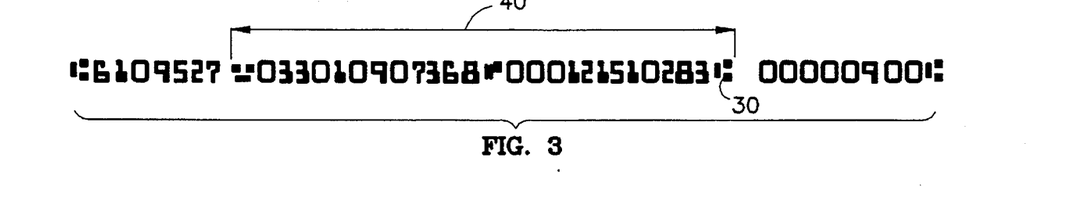
FIG. 3 is a graphic illustration of a portion of a document with bar-coded characters recorded thereon.

As indicated above, when a dark spot and bar are found, the system stores the X-Y coordinate position of the bar as an approximate start-of-field position 30 (FIG. 3), for use when searching subsequently for the character. A typical field 40 is shown in FIG. 3. The system then attempts to define the boundary of a character in the field (i.e., the character of which the discovered dark spot and bar are parts) by locating the lower-right corner of the character. Refer, for example, to corner position (starting X-Y position) 44 shown in FIG. 2.

Figure 5A:
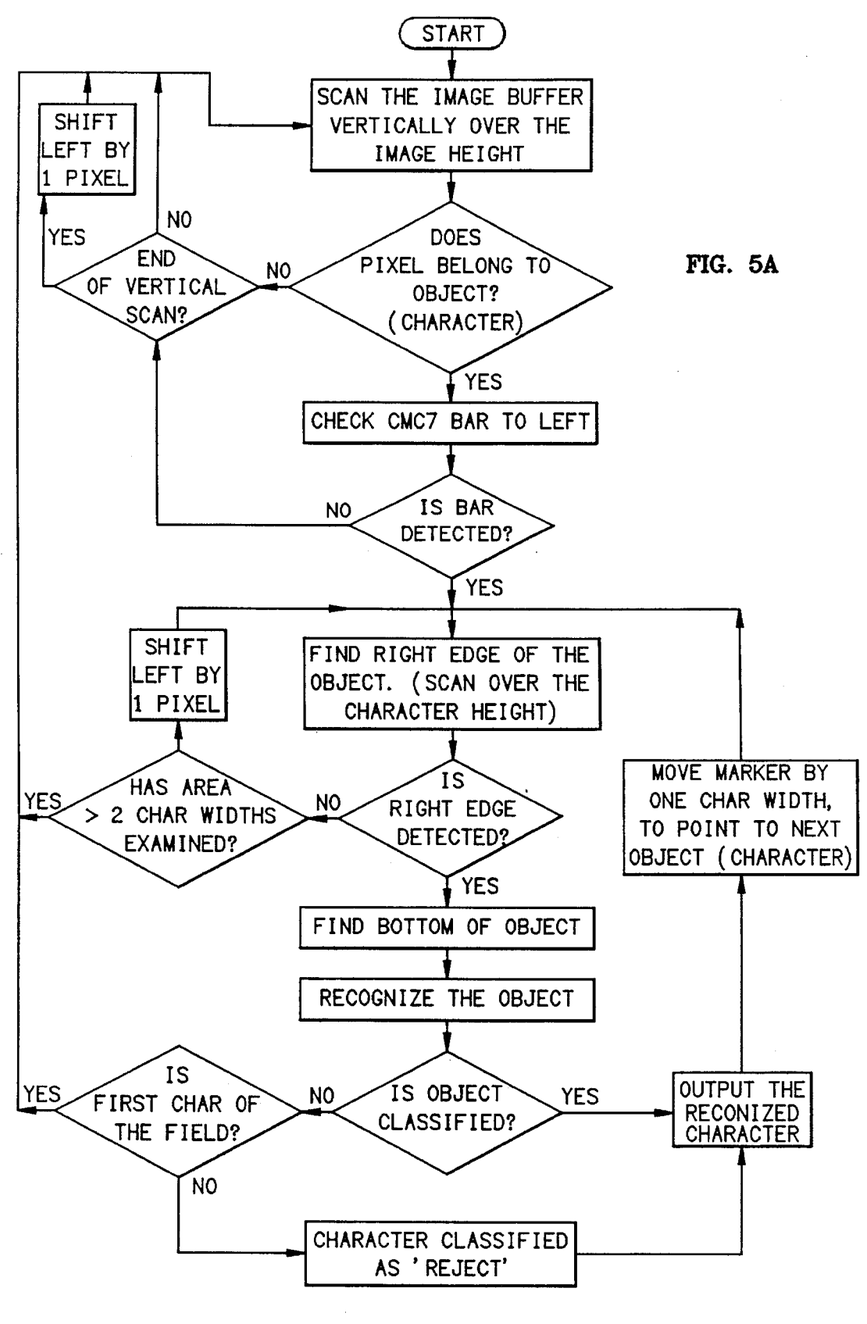
FIGS. 5A–5D are flow charts showing the operations performed by the system of FIG. 1 in determining the boundary of a character.
Figure 5B:
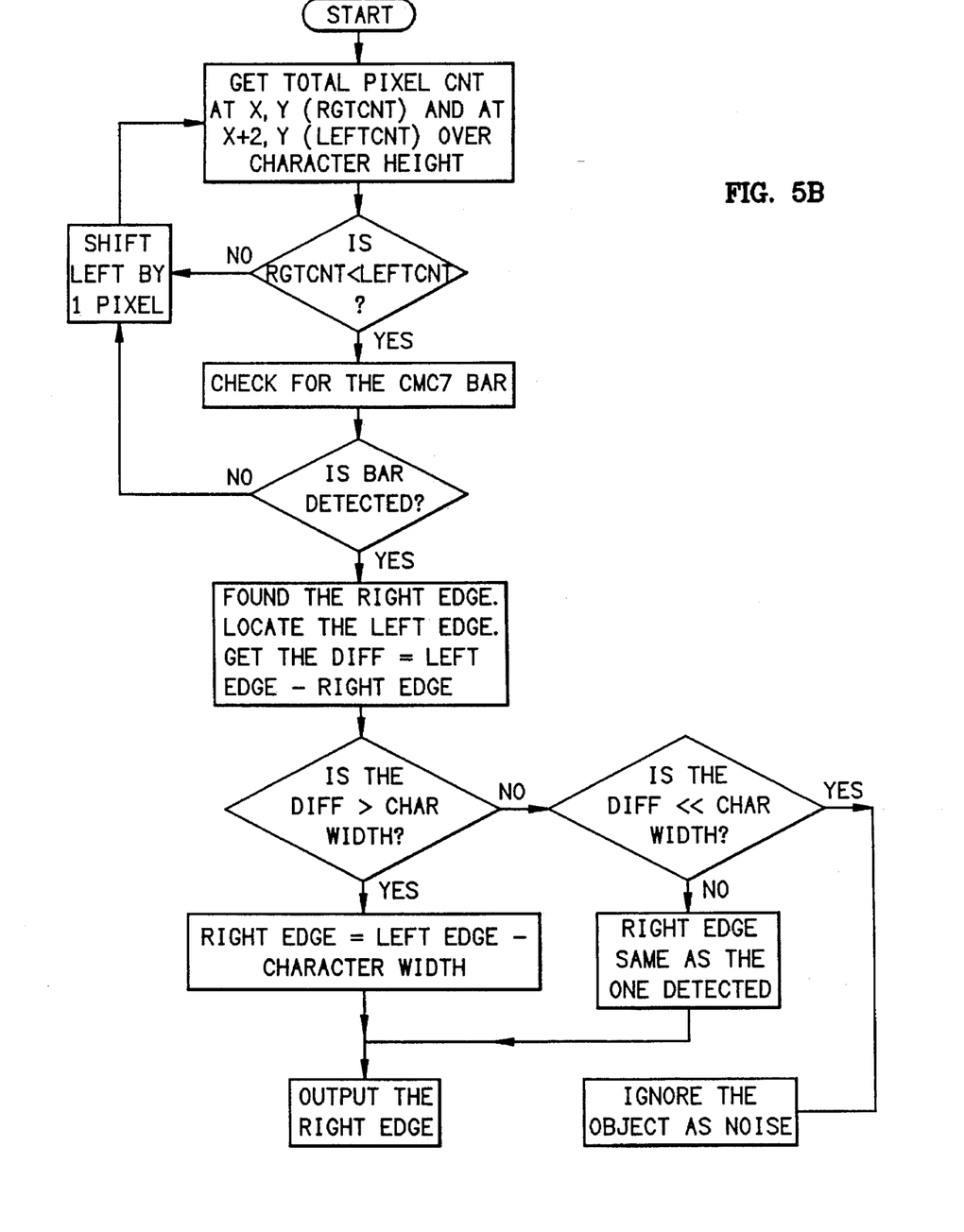
Figure 5C:
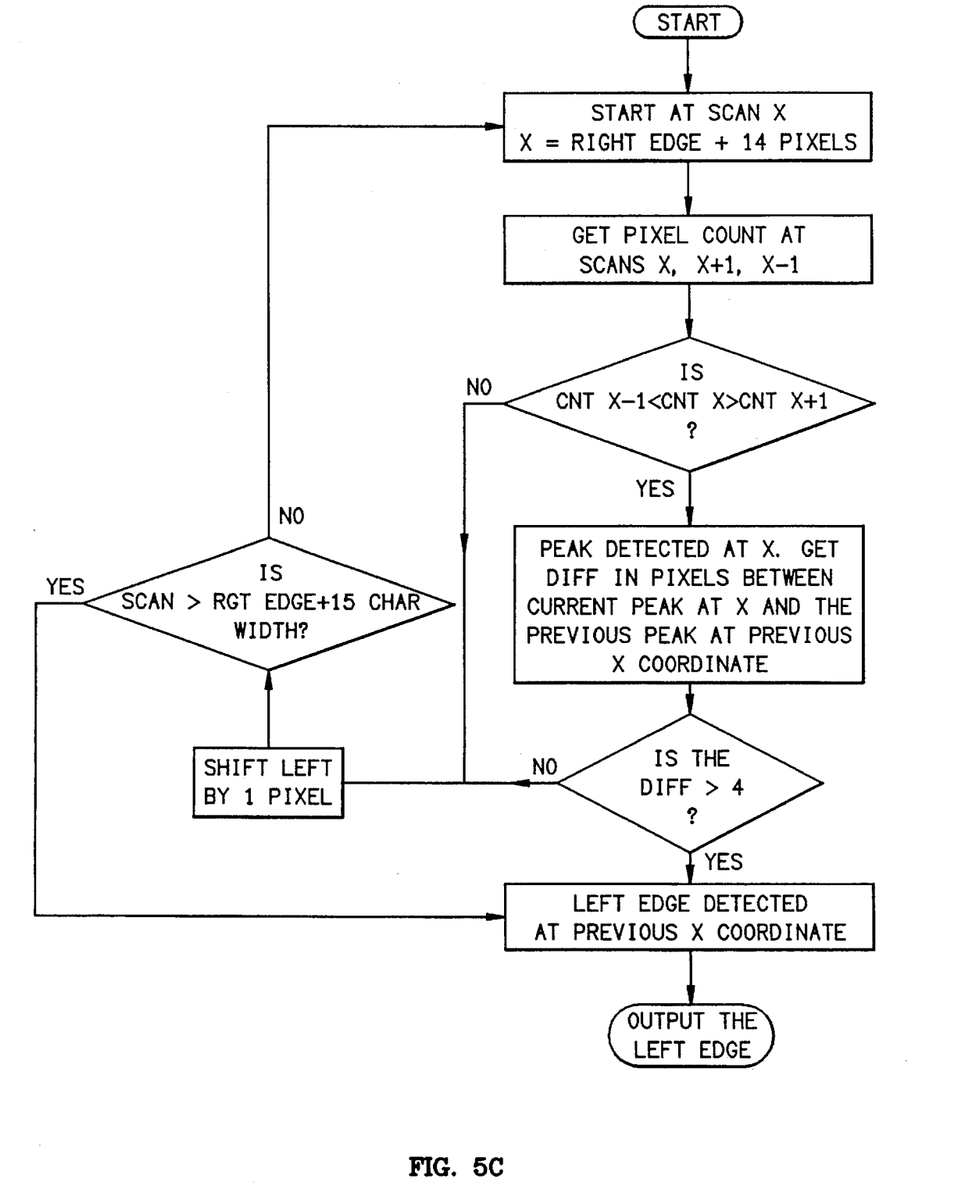
Figure 5D:
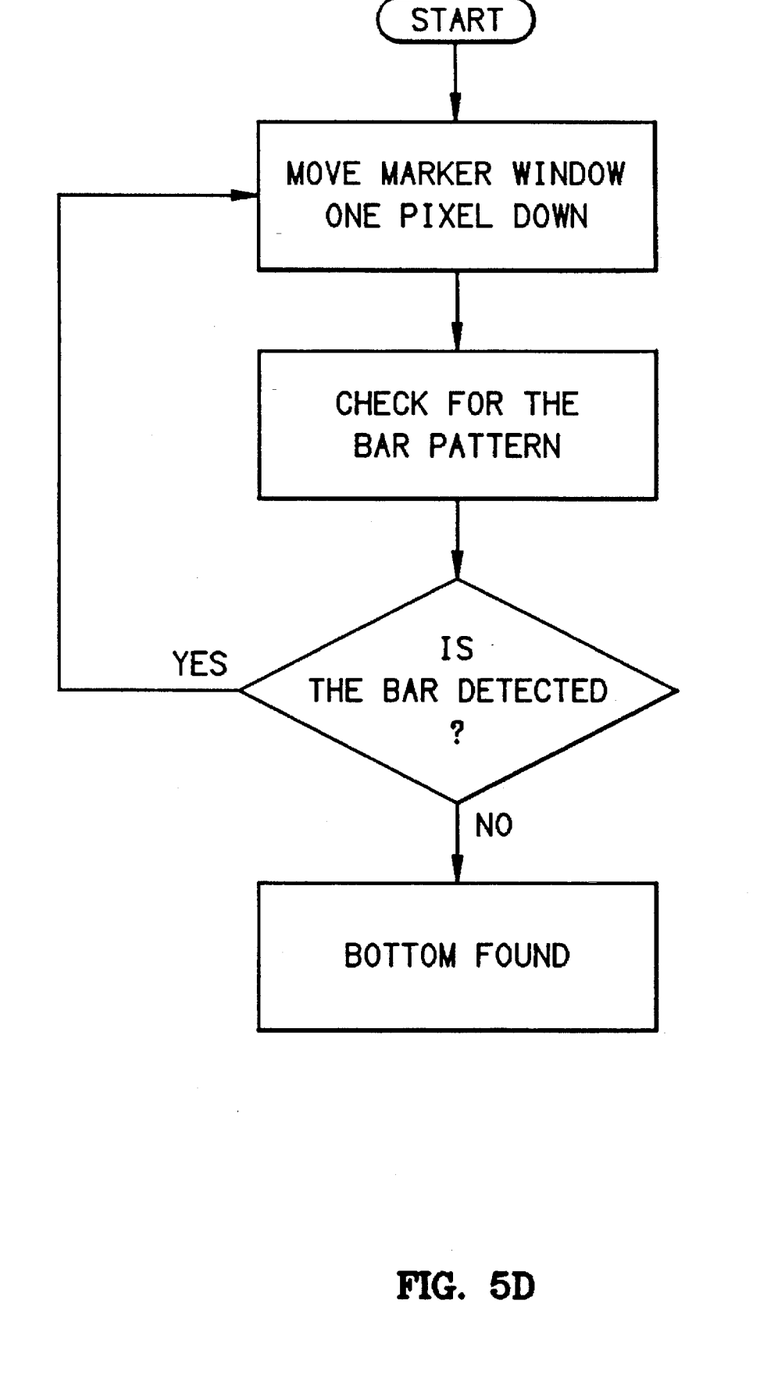
Figure 5E:
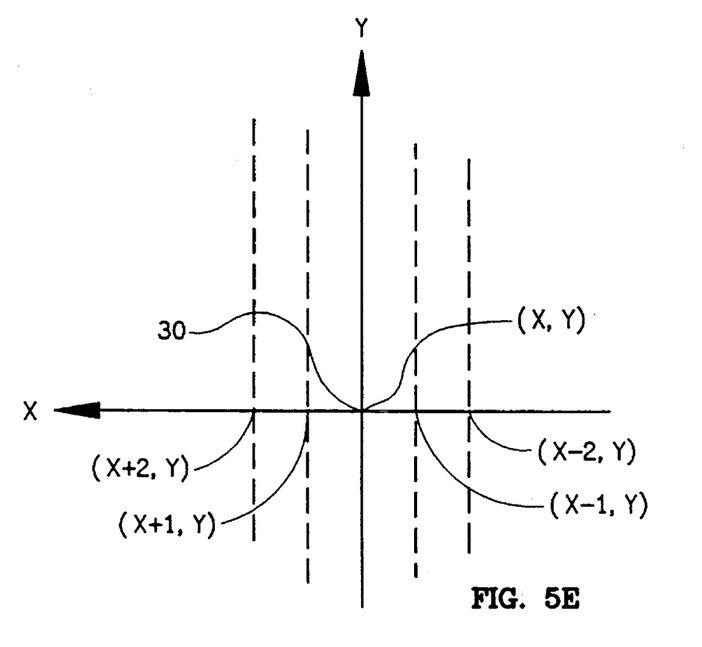
FIG. 5E is a graphic illustration of a coordinate system used by the system of FIG. 1 in determining the boundary of a character.

Referring now to FIGS. 5A and 5E, the system, starting from the (X,Y) position, first determines the location of the right edge of the detected character. It does this, as shown in FIG. 5B, by computing the total pixel value/count (i.e., a pixel count representing the sum of the gray-scale pixel values) at column locations (X,Y) and (X+2, Y) over the character's height (e.g., from (X,Y) to (X,Y+n) where, in our example of a 24-row character, the maximum value for n is 23). If the pixel count (total pixel value) at position X is not less than the pixel count at nearby position X+2 (signifying that the pixel counts are somewhat similar and there is no transition from a light interval region to a dark bar region), position X is updated by one pixel to the left, to address the next, horizontally adjacent, vertical region. The above process is then repeated.

If the pixel count at position X is less than the pixel count at position X+2, indicating that the vertical region at position X is significantly lighter than the vertical region at position X+2, this transition from light to dark signifies that a bar, (and, hence, a start of a character) may be present at X+2. The system then scans the stored data virtually vertically upward checking each horizontal segment (window) for the presence of a bar. If more than two segments contains bar-pattern information, this verifies that a character has been located. The system then proceeds to look for the left edge.

As shown in FIG. 5B, after detecting the right edge of the character and determining its coordinate ($X_r$), the system checks for the left edge. It does this, as shown in FIG. 5C, by selecting a position near to the left edge (e.g., the position ($X_r$+14), and examining the horizontally adjacent positions (e.g., positions ($X_r$+15) and ($X_r$+13)). With the ($X_r$+14) position addressed (labeled) as the X address, the ($X_r$+15) and ($X_r$+13) positions may be addressed (labeled) as the (X+1) and (X−1) addresses, respectively. The system then compares the pixel count at address X with the neighboring pixel counts at addresses (X−1) and (X+1). If the count at X is greater than the counts at (X−1) and (X+1), then X is regarded as a peak address. This peak address is then checked to determine the extent to which it differs from the previous peak address. If this difference is significant (e.g., the difference is greater than four, specified for CMC7 characters), this would indicate that an edge (a left edge) has been detected at previous peak address. If the difference is not greater than four, the pixel count at the next left-adjacent position is examined. If the width of the character has been traversed and no difference greater than four is found, the X address of the left edge is set to the X address of the right edge detected plus the character width.

As shown in FIG. 5A, after the coordinates of the right and left edges are determined, as indicated above, the difference in pixel count (horizontally measured) between the right and left edges is compared with the known (predetermined) character width. If the difference is less than a predetermined width (e.g., ten pixels), indicating that the right and left edges are too close, the character is regarded as noise and discarded. If the difference is greater than the predetermined character width, the coordinate of the right edge is adjusted by subtracting the character width from the left-edge coordinate.

After the left and right edges of the character are determined as explained above, the bottom of the character is determined, as explained below.

As shown in FIG. 5D, to determine the bottom of the character, the marker window 57 (FIG. 4) is moved down one pixel, and the neighboring pixel values are checked, as described above, to determine if a data bar pattern exists. If a data bar pattern is found, the marker window is moved down another pixel and a data bar pattern is checked for again. This procedure is repeated until no data bar pattern is found, indicating that the bottom of the character is reached. The Y coordinate representing the bottom (the last data bar pattern found) is then combined with the X coordinate representing the right edge of the character, and this (X,Y) coordinate, representing the bottom right edge of the character, is passed from the segmentation routine to the recognition routine for processing.

The foregoing is a description of the character-segmentation process. A description of the character-recognition process is presented below.

Figure 6A:
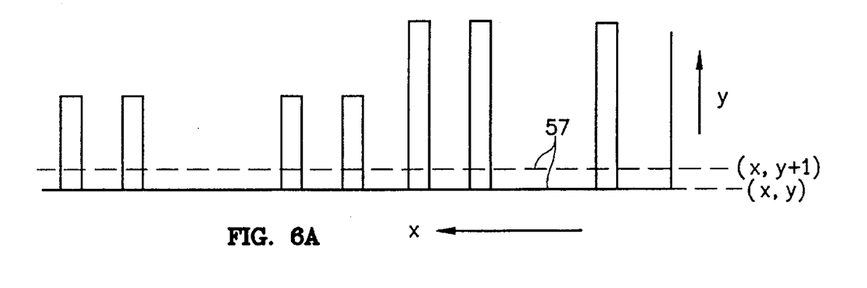
FIG. 6A is a graphic illustration of selected segments of a character cut, across the bars and intervals of the character, along the marker lines (horizontal windows) at positions (Y) and (Y+1)
Figure 6B:
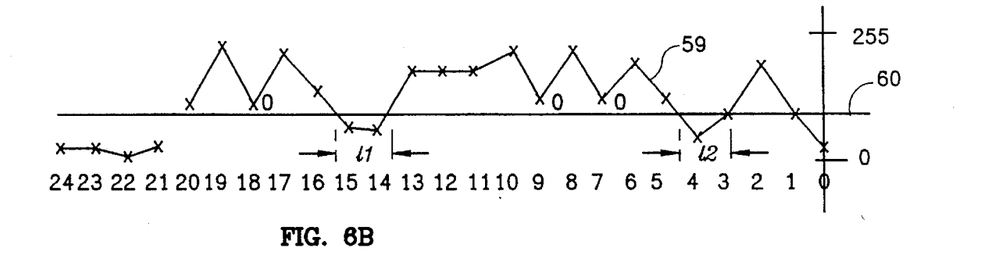
FIG. 6B is a graphic illustration of a waveform with maximum pixel values (peaks) and minimum pixel values (nulls) corresponding to the character segment at coordinate position (Y) of FIG. 6A, the peaks and nulls being expressible relative to a threshold value.
Figure 6C:
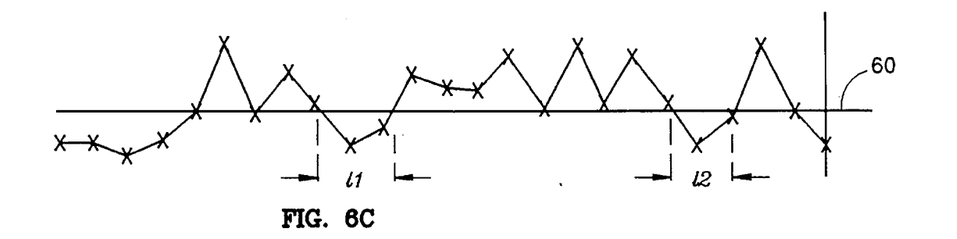
FIG. 6C is a graphic illustration of a waveform with peaks and nulls expressed relative to a threshold value, the waveform corresponding to the character segment at coordinate position (Y+1) of FIG. 6A.

As shown in FIGS. 5A and B, following the receipt of the (X,Y) coordinate information from the segmentation routine identifying the bottom-right edge of a character, the system, under control of recognition routine of the stored program, examines the gray-scale pixel values stored in memory. The values are examined a group at a time, each group corresponding to a horizontal slice (segment) of the bars and intervals of the character, as shown by window (marker line) 57 in FIGS. 4 and 6A. Window 57 represents a selected segment indicative (representative) of the character. From each group of gray-scale data values (e.g., the gray-scale values at marker line 57 of FIG. 4, as represented by waveform 59 in FIG. 6B), the system determines the maximum values (peaks) and minimum values (nulls/troughs) in the data. A null is defined as any gray-scale value which has its two adjacent values larger, and a peak is defined as any gray-scale value which has its two adjacent values smaller. Thus, as shown in FIG. 6B, peaks are detected at positions 2, 6, 8, 10, 17 and 19, and nulls are detected at window (marker-line) positions 4, 7, 9, 15 and 18. A null also seems to exist at position 12. To determine with greater confidence if a null does exist, the window (marker line) 57 is moved up the character to another Y-coordinate position e.g., to position (Y+1) in order to select another slice of the character (i.e., to select the next group of gray-scale values for examination). As shown in FIG. 6C, the nulls detected within this next slice (i.e., among this next group of gray-scale values) are 4, 7, 9, 12, 15 and 18. (Optionally, even a third slice of the character may be examined to boost the confidence level associated with the null and peak values.)

From the nulls, a threshold level (average gray-scale value) 60 is calculated as follows:

THRESHOLD LEVEL=SUM OF NULL Gray-SCALE PIXEL VALUES/NUMBER OF NULLS

To correctly identify the character, the system first develops (derives) a binary code for the character by assigning a "0" each short interval and a "1" to each long interval. It is possible for pixel samples of a short interval to fall below the threshold. All the intervals that fall below the threshold have their widths measured. The two intervals with the widest widths are assumed to be long intervals. Any interval that does not fall below the threshold is labeled a short interval. As a special case, for the example shown in FIG. 6B, the system assigned a "0" to each null above the threshold, and a "1" to each null below the threshold. Thus, from a slice of the bar pattern (i.e., from a window of gray-scale pixel values) shown in FIG. 6A, a binary code of "010001" (corresponding to the pattern of peaks and nulls shown in the waveform of FIGS. 6B and 6C) is produced (derived) representing the character.

The system then compares the derived binary code to predetermined codes of various characters prestored in RAM 27 (FIG. 1). The stored codes, which are arranged in look-up-table form as shown in Table I below, includes various binary codes and corresponding character representations.

TABLE I

LOOK-UP TABLE FOR CMC7 CHARACTER SUBSET

| Char. | Binary Code |
|---|---|
| 0 | 0 0 1 1 0 0 |
| 1 | 1 0 0 0 1 0 |
| 2 | 0 1 1 0 0 0 |
| 3 | 1 0 1 0 0 0 |
| 4 | 1 0 0 1 0 0 |
| 5 | 0 0 0 1 1 0 |
| 6 | 0 0 1 0 1 0 |
| 7 | 1 1 0 0 0 0 |
| 8 | 0 1 0 0 1 0 |
| 9 | 0 1 0 1 0 0 |
| S1 | 1 0 0 0 0 1 |
| S2 | 0 1 0 0 0 1 |
| S3 | 0 0 1 0 0 1 |

The derived code, which is presented solely for the purposes of illustration, is shown to match the binary code for the control character "S2." The character code corresponding to the derived code is then passed by the recognition routine to the segmentation routine for further processing. If the derived code does not match any of the stored binary codes, this non-match (reject) condition is also passed to the segmentation routine.

In the process of "recognizing" a scanned character, the system, under control of the recognition routine, also determines other factors such as confidence level, as described below.

Figure 7:
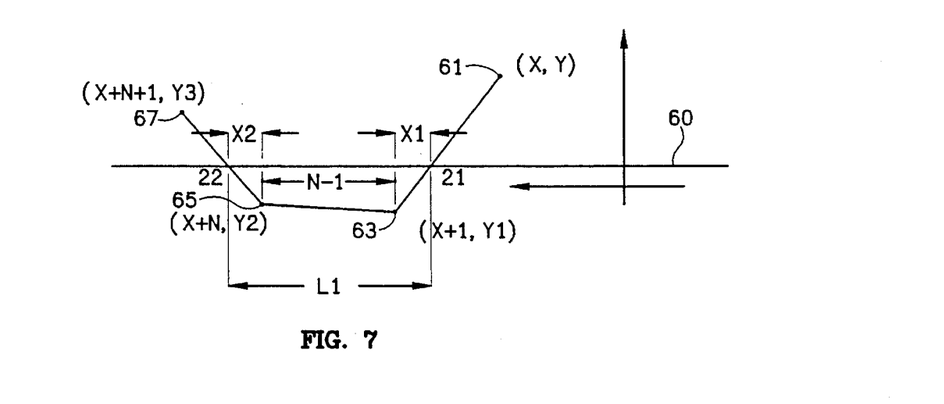
FIG. 7 is a graphic illustration of a null expressed relative to a threshold for determining the width of a long interval of a character.

Referring to FIG. 7, it can be seen how the relationship between the pixel values and the threshold value (t) 60 may be used by the system to determine (calculate) the widths of the long intervals of the character. The pixels 61, 63 are shown as neighboring pixels, at horizontal positions, (X) and (X+1), with gray-scale pixel values of (Y) and (Y1), respectively, the value (Y1) being less than (Y). Likewise, the pixels 63 and 65, and 65 and 67 are shown as neighboring pixels. The pixels 65 and 67 are shown as neighboring pixels. The pixels 65 and 67 at positions (X+n) and (X+n+1) have gray-scale values of (Y2) and (Y3), respectively, with (Y3) being greater than (Y2).

The long interval L1 is calculated as follows:

$$L1=X1+(n-1)+X2$$

where, $(n-1)=(x+n)-(x+1)$ $X1=(t-Y1)/(Y-Y1)$ $X2=(t-Y2)/(Y3-Y2)$

This calculated value representing the width of the long interval is then compared to a predetermined long-interval value (stored in RAM 27) for the character. The result of the comparison is used in determining a confidence level factor, as described below.

As indicated above, the system provides a code for the detected character when a match occurs between the derived binary code and one of the predetermined binary codes. In addition to the code, the system also provides a confidence-level indication (e.g., 0% to 100%) after determination of the code, and improves the confidence level depending on the result obtained from additional examinations of the character. Additional examination results may be obtained when a second or third window 57 (FIG. 4) is used to examine additional gray-scale values, or obtained when the width of the long interval (calculated as described above, and as shown in FIG. 7) is compared to the predetermined long-interval value for the character.

A confidence level is returned per scan, and is accumulated on successive scans until a high enough level is reached. If a high enough level is not reached, a reject code is outputted. Conditions (factors) which affect confidence level determination include:

the widths of the long intervals falling within an expected range the two long intervals having approximately the same widths the distance between the second and third longest interval (if a third interval is detected) exceeding a fixed minimum.

the distance of the peaks of the segment from the threshold all six nulls were detected (one or more short interval may have been missed but their positions were detected).

all six nulls were not detected (one or more short interval may have been missed but their positions were detected).

all six nulls were not detected.

If no match occurs between the derived and predetermined binary codes, a reject indication is provided, and the system under control of the segmentation routine, continues scanning until a character is identified (recognized), or until the top of the character has been reached.

Following detection and identification of a character, the system proceeds to detect the next character in the field (as shown in FIG. 3), by searching the stored pixel values (as if proceeding leftward on the document) for the right edge of the next character. If a right edge is not found within two character positions, the above-mentioned processing operations are repeated until all of the stored pixel values have been processed.

While the present invention is susceptible of embodiment in various forms, there is shown in the drawings and described in the specification a presently preferred embodiment, with the understanding that the present disclosure is to be considered as an exemplification of the invention, and is not intended to limit the invention to the specific embodiment illustrated.

What is claimed is:

1. Optical character recognition apparatus comprising:

means for optically scanning in a first direction a bar-coded human readable character having a predetermined pattern of bars and intervals of different opacities on a document, and producing a plurality of gray-scale pixel values corresponding to said pattern;

memory means disposed for storing the gray-scale pixel values, said memory means including a stored program and a predetermined binary code for the character; and processing means coupled to the scanning means and to the memory means, and operating under control of the stored program, for specifying a segment of the character by selecting in a second direction perpendicular to said first direction from said gray-scale pixel values a first set of values representative of the segment, for producing a binary code corresponding to the first set of values, and for identifying the character by matching the produced binary code to the predetermined binary code.

2. The apparatus of claim 1 wherein said processing means includes a means for determining, from the pixel values, a location of the character on the document.

3. The apparatus of claim 2 wherein said processing means includes a means for identifying the bottom edge of the character.

4. The apparatus of claim 3 wherein said processing means further includes a means for identifying the right and left edges of the character and the bottom-right corner coordinate of the character.

5. The apparatus of claim 4 wherein said scanning means includes a means for reading from the bottom edge to the top edge in said first direction parallel to the bars of the character.

6. The apparatus of claim 5 wherein said specified segment is indicative of said character.

7. The apparatus of claim 6 wherein said processing means includes a means for indicating a segment of predetermined width, and height of at least one pixel.

8. The apparatus of claim 7 wherein said predetermined segment width is at least 25 pixels wide.

9. The apparatus of claim 8 wherein said processing means also includes a means for specifying a segment direction perpendicular to said first direction.

10. The apparatus of claim 9 wherein said processing means further includes a means for selecting a second set of minimum gray-scale values from said first set of values for representing the intervals of the character.

11. The apparatus of claim 10 wherein said processing means includes a means for deriving a threshold value equivalent to the arithmetic mean of said minimum gray-scale values.

12. The apparatus of claim 11 wherein said processing means also includes a means for expressing the produced binary code in terms of widths of the intervals, the intervals corresponding to the magnitudes of the minimum values relative to the threshold value.

13. The apparatus of claim 12 wherein said processing means further includes a means for matching the produced binary code to a predetermined binary code.

14. The apparatus of claim 13 wherein said gray-scale pixel values range from 0 to 255.

15. The apparatus of claim 14 wherein said bar-coded character is a member of the CMC7 character set.

16. The apparatus of claim 15 wherein each of said produced and predetermined binary codes is a six-bit word.

17. A method of optically identifying a bar coded character on a document, the character having a predetermined height and width and a predetermined pattern of bars and intervals of different opacities, the method comprising the steps of:

optically scanning the character in a first direction and producing a plurality of gray-scale pixel values representing the bars and intervals;

specifying a segment of the character for processing, by selecting in a second direction perpendicular to said first direction from said gray-scale pixel values a first set of values representative of the segment;

producing a binary code corresponding to the selected first set of gray-scale values; and identifying the character by matching the produced binary code to a predetermined binary code representing the character.

18. The method of claim 17 where the step of specifying a segment includes the steps of identifying the bottom, right, and left edges, and the bottom-right corner coordinate of the character.

19. The method of claim 18 where the step of optically scanning the character includes the step of reading from the bottom edge to the top edge in a first direction parallel to the bars of the character.

20. The method of claim 19 where the step of specifying a segment includes the step of indicating a segment height of at least one pixel, a segment width of at least twenty-five pixels, the segment representing a cross-section of the bars and intervals across the width of the character.

21. The method of claim 20 where the step of producing includes the step of selecting a second set of minimum gray-scale values from said first set of values.

22. The method of claim 21 where the step of producing further includes the step of deriving a threshold value equivalent to the arithmetic mean of said minimum values.

23. The method of claim 22 where the step of producing also includes the step of deriving a binary code in terms of widths of the intervals, the intervals corresponding to the magnitudes of the minimum values being greater or less than the threshold value.

24. The method of claim 23 where the step of identifying includes the step of matching the derived binary code to a predetermined binary code representing the character.

25. A method of representing a bar-coded character having bars and intervals of different opacities, the method comprising the steps of:

scanning the character in a first direction and producing a plurality of gray-scale values representing the bar and intervals of the character;

selecting in a second direction perpendicular to said first direction from the plurality of gray-scale values a set of values representing a segment of the character, the segment being indicative of said character;

determining the minimum values in the set;

producing a threshold value from the minimum values;

producing a binary code in terms of the widths of the intervals, the intervals corresponding to the magnitude of the minimum values relative to the threshold value, the binary code representing the bar coded character.

26. The method of claim 25 where the step of producing a threshold value includes the step of determining the arithmetic average of the minimum values.

27. The method of claim 26 where the step of selecting includes the step of specifying a horizontal segment across the width of the character with said horizontal segment being perpendicular to said first direction.

28. The method of claim 27 where the step of producing a binary code includes the step of producing a bit for each selected minimum value less than the threshold value, and a different bit for other minimum values.

29. The method of claim 28 where the step of producing a binary code includes the step of representing the long intervals of the character as selected minimum values less than the threshold value, and representing the short intervals as the other minimum values.

30. The method of identifying a bar-coded character having a plurality of bars and intervals of different opacities imaged on a document said document being optically scannable in a first direction with images thereon representable as a plurality of gray-scale pixel values, the character being representable by a predetermined binary code, the method comprising the steps of:

selecting from said pixel values, a first set of values representing the character;

selecting, from said first set, a second set of pixel values representing a segment of the character, said segment being indicative of the character and being obtained from a second direction which is perpendicular to said first direction;

determining, from said second set, maximum and minimum values corresponding to the bars and intervals of the character;

developing a threshold value from said minimum values;

deriving a binary code in terms of the widths of intervals, the intervals corresponding to the magnitudes of the minimum values relative to the threshold value; and identifying the character by matching the derived binary code to the predetermined binary code.

* * * * *

UNITED STATES PATENT AND TRADEMARK OFFICE
CERTIFICATE OF CORRECTION

PATENT NO. : 5,563,958
DATED : October 8, 1996
INVENTOR(S) : Raymond L. Higgins et al.

It is certified that error appears in the above-indentified patent and that said Letters Patent is hereby corrected as shown below:

On title page, item [54] and col. 1, line 1,

"[54] "SYSTEM AND METHOD FOR OPTICAL CHARACTER RECOGNITION BAR-CODED CHARACTERS" should be --[54] SYSTEM AND METHOD FOR OPTICAL CHARACTER RECOGNITION OF BAR-CODED CHARACTERS--

Signed and Sealed this

Twenty-seventh Day of May, 1997

Attest:

BRUCE LEHMAN

Attesting Officer

Commissioner of Patents and Trademarks